United States Patent [19]

Ayers

[11] Patent Number: 4,832,844
[45] Date of Patent: May 23, 1989

[54] SEAL FOR A SPIN-ON FILTER

[76] Inventor: William R. Ayers, P.O. #127, Bement, Ill. 61813

[21] Appl. No.: 870,803

[22] Filed: Jun. 5, 1986

[51] Int. Cl.$^4$ ............................................. B01D 27/08
[52] U.S. Cl. .................... 210/440; 210/443; 210/450; 210/DIG. 17; 277/168; 277/195; 55/502
[58] Field of Search .............. 210/439, 440, 443, 444, 210/450, D17; 55/502; 277/35, 37, 38, 50, 135, 168, 169, 170, 195

[56] References Cited

U.S. PATENT DOCUMENTS

| | | | |
|---|---|---|---|
| 2,626,822 | 1/1953 | Boyd | 277/50 |
| 3,076,551 | 2/1963 | Humbert, Jr. | 210/440 |
| 3,557,963 | 1/1971 | Offer | 210/450 |
| 3,677,413 | 7/1972 | Connor | 210/440 |
| 3,685,659 | 8/1972 | Haskett et al. | 210/444 |
| 3,929,643 | 12/1975 | Donaldson et al. | 210/D17 |
| 4,035,306 | 7/1977 | Maddocks | 210/440 |
| 4,045,349 | 8/1977 | Humbert, Jr. | 210/D17 |
| 4,168,237 | 9/1979 | Pickett et al. | 210/440 |
| 4,169,058 | 9/1979 | Pickett et al. | 210/440 |

Primary Examiner—Richard V. Fisher
Assistant Examiner—Wanda L. Millard
Attorney, Agent, or Firm—Wood, Dalton, Phillips, Mason & Rowe

[57] ABSTRACT

Leakage under pressure of fluid through the interface of a filter and a filter head or cover casting during removal of the filter is avoided by the use of a stepped gasket at the interface of the filter and the cover casting. The stepped gasket has both axially facing and radially facing sealing surfaces with the latter serving to maintain a seal at the interface over an extended interval during the removal process, which interval is sufficient to enlarge the volume of the system to eliminate any pressure differential from the interior of the system to the ambient.

10 Claims, 1 Drawing Sheet

U.S. Patent May 23, 1989 4,832,844
FIG. 1
FIG. 2
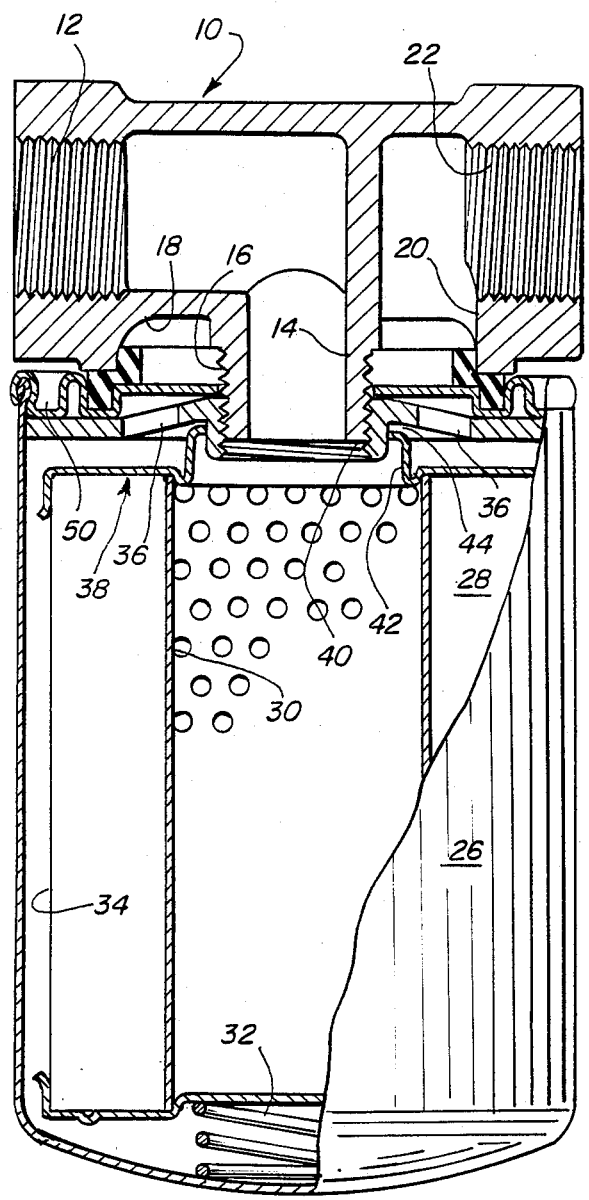
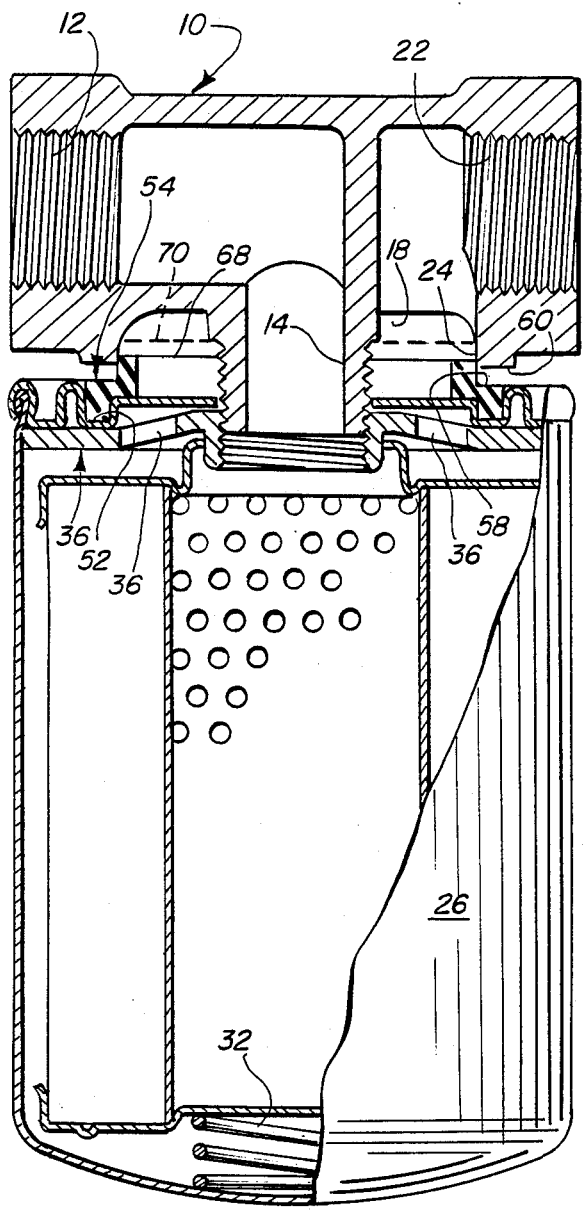
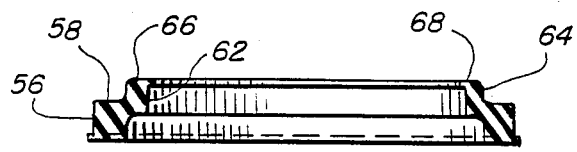
FIG. 3

SEAL FOR A SPIN-ON FILTER

FIELD OF THE INVENTION

This invention relates to spin-on filters, and more specifically, to an improved seal or gasket for use in sealing the interface between the spin-on filter and a so called head or cover casting.

BACKGROUND OF THE INVENTION

There are many applications for spin-on filters. Typically, the filter includes a cannister which contains a filter element and has a face provided with a central internally threaded port for screw on attachment to a threaded male port on a header cover casting. A second port, generally a plurality of second ports, is located radially outwardly of the internally threaded port and is alignable with an annular port on the cover casting. An annular seal is disposed on the face of the filter and has an axially facing seal surface centered about the internally threaded port and located outwardly of the second port to be engageable with an annular, axially facing seat surrounding the annular port of the cover casting. In the usual case, the seal is located in an axially opening groove in the face of the filter and extends somewhat out of the same. When the filter is being screwed on the threaded male port of the cover casting, upon contact of the seal with the annular seat, the seal becomes compressed to establish good sealing engagement between the seal and the seat.

These seals work well for their intended purpose. However, in some instances, replacement of the filter may pose a problem in terms of leakage of the fluid being filtered from the filter-cover casting interface, which leakage may be under pressure.

In particular, where such filters are employed in valve systems, the closing of the valves preliminary to removing of the filter frequently results in a trapped body of fluid between the valves and within the filter, which trapped body of fluid is under pressure and is maintained under pressure because of slight expansion of system components in response to such pressure when the valves were opened.

When the filter is unscrewed from the cover casting, almost immediately the sealing engagement between the seal on the filter and the seat on the cover casting is lost. Residual pressure within the system then causes the fluid to squirt through such interface, an undesirable occurrence.

One attempt to solve this problem is illustrated in a U.S. Pat. No. 3,685,659 issued Aug. 22, 1972, to Heskett, et al. Heskett employs a separate valve as part of his system construction which may be operated to pass a small amount of fluid to an external receiving chamber to relieve pressure prior to removal of a filter bowl from a filter head. Though this approach is operative, it first of all requires a conscious effort on the part of the user of the system to utilize the valve to dissipate pressure prior to filter bowl removal or else the pressure will not be dissipated. Consequently, in the case of a forgetful operator, the Heskett, et al, system cannot provide this intended and desirable function.

Another disadvantage of the Heskett system is the fact that its fabrication requires the use of a valve element along with a special chamber. These components add to the complexity of the system, therefore substantially increasing the cost thereof.

The present invention is directed to overcoming the above problem.

SUMMARY OF THE INVENTION

It is the principal object of the invention to provide a new and improved filter construction. More specifically, it is an object of the invention to provide an improved seal in a filter construction of the type mentioned previously which does not lose sealing contact at the interface between a filter and a cover casting until any residual pressure within the system has been dissipated.

An exemplary embodiment of the invention constitutes an improvement in a filter construction of the usual sort which includes a cannister containing a generally cylindrical filter element and having a face provided with a central, internally threaded port for screw on attachment to a threaded male port on a cover casting. A second port is located radially outwardly of the internally threaded port and is alignable with an annular port in the cover casting. An annular seal having an axially facing seal surface is centered about the internally threaded port and located outwardly of the second port to be engageable with an annular axially facing seat surrounding the annular port in the cover casting. The invention specifically contemplates the improvement wherein the seal further includes a radially outwardly facing shoulder located just radially inwardly of the seal surface and disposable within the annular port and sealing relation to the outermost side thereof.

As a result of this construction, a seal is maintained between the surface of the radially outwardly facing shoulder and the outermost side of the annular port while the filter is being moved axially away from the cover casting during the unscrewing of the filter from the cover casting. At the same time, the volume of the interface between the cover casting and the filter and confined by the seal is increasing to accommodate fluid under pressure from elsewhere in the system to thereby dissipate the pressure before sealing contact between the shoulder and the outermost side of the annular port is lost.

According to one embodiment of the invention, the shoulder is defined by an axial extension of the seal. The extension is directed away from the face.

According to the one embodiment of the invention, the extension is displaced radially from the remainder of the seal and preferably is displaced radially inwardly from the remainder of the seal.

The shoulder has sufficient axial length so as to be in sealing contact with the outermost side of the annular port even when the seal surface and the seat are substantially separated.

Preferably, the axially facing sealing surface and the radially facing shoulder defining a further sealing surface adjoin one another along a common boundary.

Other objects and advantages will be come apparent from the following specification taken in connection with the accompanying drawings.

DESCRIPTION OF THE DRAWINGS

FIG. 1 is a sectional view of a filter embodying a seal made according to the invention fully installed on a head of cover casting;

FIG. 2 is a view similar to FIG. 1 but illustrating the filter at a location whereat it is almost detached from the cover casting;

FIG. 3 is a sectional view of a preferred seal configuration.

DESCRIPTION OF THE PREFERRED EMBODIMENT

An exemplary embodiment of the invention is illustrated in the drawings and with reference to FIG. 1 is intended for use with with a conventional filter head or cover casting, generally designated 10. The cover casting 10 includes an inlet 12, in fluid communication with a male port 14 that is externally threaded as at 16. Surrounding the male port 14, is an annular port 18, connected via a passage 20, to an outlet 22. As best seen in FIG. 2, the annular port 18 has a generally cylindrical surface 24 at its location most remote from the outlet 22 and the cylindrical surface 24 defined by the outermost side of the port 18 is centered about the male port 14.

A filter includes a generally cylindrical cannister 26 containing an interior filter element 28. The filter element 28 includes a perforated cylindrical core 30, and is biased upwardly by means of a spring 32 within the cannister 26. The exterior surface 34 of the filter element 28 is in fluid communication with a series of apertures or ports 36 in a face, generally designated 38, closing the open end of the cannister 26. The ports 36 are in alignment with the annular port 18 in the cover casting 10.

The face 38 includes a central, internally threaded, female port 40, aligned with the perforated core 30. A sleeve 42 and annular gasket 44 within the cannister 26 served to seal the port 40 to the core 30 during normal operations. Thus, when the face 38 is screwed or spun on to the male port 14, fluid entering the filter via the male port 14 must pass through the filter element 28 to exit the filter via the ports 36 and the annular port 18 in the cover casting.

As is well known, should the filter element 28 become plugged, the increase in pressure on the inlet side will eventually push the filter element 28 downwardly within the cannister 26 against the bias of the spring 32 until the seal at the gasket 44 is lost, allowing bypassing of the filter element 28 altogether.

As is generally conventional with filters of this type, the face 38 may include a relatively thin stamping 50 which is provided with an axially opening groove 52 located just radially outwardly of the ports 36. A seal generally designated 54, is disposed in such groove. The seal 54 is made up of two bodies of sealing material which are integral with each other. A first is a body 56 which is received within the groove 54 to be sealed therein and which includes an axially facing sealing surface 58 oppositely of the groove 52. The sealing surface 58 is adapted to seal against a conventional axially facing seat 60 surrounding the annular port 18 on the cover casting. This much of the sealing function may be regarded as conventional.

A second body of the seal is designated 62. It is in the form of an axial extension from the body 56 which is displaced somewhat radially inwardly as best seen in FIG. 3 and which includes a generally cylindrical, radially outwardly facing sealing surface 64 of slightly greater diameter than the cylindrical surface 24 of the annular port 18. Stated another way, the body 62 and surface 64 define a radially outwardly facing shoulder on the seal. That part of the shoulder most remote from the body 56 may be slightly rounded as shown at 66.

When the filter is to be installed to a cover casting 10, the filter, via the internal threaded port 40, is threaded on the male threaded port 14 of the cover casting. Continued rotation of the cannister 26 axially advances the filter element so that the shoulder enters into the annular port 18. The round 66 may assist in such entry. Ultimately, a seal is established between the sealing surface 58 on the seal body 56 and the seat 60. In addition, because sealing surface 64 is of slightly greater diameter than the outermost side 24 of the annular port 18, a seal will be established at that location as well.

When it becomes necessary to replace the filter, the same is rotated in the opposite direction from the direction of rotation during installation.

As with a conventional filter arrangement, upon the initiation of filter removal, the seal at the interface defined by the sealing surface 56 and the seat 60 is lost almost immediately. Consequently, in the conventional sealing arrangement, any pressurized fluid remaining in the system would be free to squirt through such interface into the surrounding environment. However, as can best be seen in FIG. 2, the edge 68 of the seal remote from the face 38 may move axially the distance illustrated in FIG. 2 between the edge 68 and a dotted line marked 70 before the seal provided by engagement of the surfaces 24 and 64 at the interface of the cover casting 10 and the filter is lost. This also means that the volume of the system is being increased by a volume equal to the volume of a cylinder having a length equal to the distance between the edge 68 and the line 70 and a radius equal to that of the outer side 24 of the annular port 18 less approximately the volume of a cylinder having the same length and a radius equal to the outer diameter of the male port 14 plus the volume of a cylinder of the same length having a radius equal to the internal diameter of the male port 14.

Because the filter will be used with so called incompressible fluids, it will be appreciated that even a slight increase in the confined volume will rapidly reduce the pressure within the volume. Thus, the increase in volume that occurs before the seal is lost will typically be sufficient to eliminate entirely any pressure differential between the interior of the system and the ambient. As a consequence, there will be no pressure instituted, forceful expulsion of fluid at the interface between the cover casting and the filter upon removal of the same.

I claim:

1. In a filter construction including a cannister containing a generally cylindrical filter element and having a face provided with a central internally threaded port for screw on attachment to a threaded male port on a cover casting, a second port radially outwardly of the internally threaded port and alignable with an annular port in the cover casting, and an annular seal having an axially facing seal surface centered about said internally threaded port and located outwardly of said second port and engageable with an annular, axially facing seat surrounding said annular port, the improvement wherein said seal further includes a radially outwardly facing shoulder disposable within said annular port in sealing relation to the outermost side thereof.

2. The filter of claim 1 wherein said shoulder is defined by an axial extension of said seal, said extension being directed away from said face.

3. The filter of claim 2 wherein said extension is displaced radially from the remainder of said seal.

4. The filter of claim 3 wherein said extension is displaced radially inwardly from the remainder of said seal.

5. In a filter construction including a cannister containing a generally cylindrical filter element and having a face provided with a central internally threaded port for screw on attachment to a threaded male port on a cover casting, a second port radially outwardly of the internally threaded port and alignable with an annular port in the cover casting, and an annular seal having an axially facing seal surface centered about said internally threaded port and located outwardly of said second port and engageable with an annular, axially facing seat surrounding said annular port, the improvement wherein said seal further includes a radially outwardly facing shoulder located just radially inwardly of said seal surface and disposable within said annular port in sealing relation to the outermost side thereof, said shoulder having sufficient axial length as to be in sealing contact with the outermost side of said annular port even when said seal surface and said seat are substantially separated.

6. A filter comprising:
- a generally cylindrical cannister;
- a face closing one end of said cannister;
- a filter element in said cannister;
- a central female threaded port in said face;
- an additional port in said face radially outwardly of said threaded port;
- means within the cannister for normally requiring flow between said ports to pass through said filter element;
- an axially opening annular groove in said face centered about said female port and located radially outwardly of said additional port; and
- a seal for said face, said sealing including a first annular body disposed in said groove and having a first generally axially facing sealing surface oppositely of said groove and a second annular body of differing radius for said first body and having a second, generally radially facing sealing surface axially spaced from said face.

7. The filter of claim 6 wherein said first and second sealing surfaces adjoin one another along a common boundary.

8. The filter of claim 6 wherein said bodies are integral.

9. The filter of claim 6 wherein said second sealing surface faces radially outwardly and is located radially inwardly of said first sealing surface.

10. The filter of claim 9 wherein said first and second sealing surfaces adjoin one another along a common boundary.

* * * * *